US012654178B2

(12) United States Patent
Bowley et al.

(10) Patent No.: US 12,654,178 B2
(45) Date of Patent: Jun. 16, 2026

(54) ADJUSTABLE INLET ASSEMBLY FOR SAND SEPARATOR

(71) Applicant: ENERCORP ENGINEERED SOLUTIONS INC., Calgary (CA)

(72) Inventors: Ryan Thomas Bowley, Calgary (CA); Brent James William Coombe, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 0 days.

(21) Appl. No.: 19/341,172

(22) Filed: Sep. 26, 2025

(65) Prior Publication Data

US 2026/0021496 A1 Jan. 22, 2026

Related U.S. Application Data

(63) Continuation of application No. 17/731,385, filed on Apr. 28, 2022, now abandoned.

(60) Provisional application No. 63/181,631, filed on Apr. 29, 2021.

(51) Int. Cl.
*B04C 5/04* (2006.01)

(52) U.S. Cl.
CPC .................................... *B04C 5/04* (2013.01)

(58) Field of Classification Search
CPC ....................................................... B04C 5/04
USPC ........................................................ 209/132
See application file for complete search history.

(56) References Cited

U.S. PATENT DOCUMENTS

| | | | |
|---|---|---|---|
| 453,105 | A | 5/1891 | Bretney |
| 769,808 | A | 9/1904 | Venderbrush et al. |
| 2,010,128 | A | 8/1935 | Arnold |
| 2,102,525 | A | 12/1937 | Freeman |
| 2,346,005 | A | 4/1944 | Bryson |
| 2,385,745 | A | 9/1945 | Vogt |
| 2,667,944 | A | 2/1954 | Crites |
| 2,796,808 | A | 6/1957 | Scott |
| 2,816,658 | A | 12/1957 | Braun et al. |
| 2,840,240 | A | 6/1958 | Snyder |
| 2,995,255 | A | 8/1961 | Demeter |
| 3,025,965 | A | 3/1962 | Bergman et al. |

(Continued)

FOREIGN PATENT DOCUMENTS

| | | | |
|---|---|---|---|
| WO | 2015162439 | A1 | 10/2015 |
| WO | 2016134403 | A1 | 9/2016 |
| WO | 2016153458 | A1 | 9/2016 |

*Primary Examiner* — Terrell H Matthews
(74) *Attorney, Agent, or Firm* — Grollitsch Law, PLLC

(57) ABSTRACT

A cyclone separator for use with a well is disclosed. The cyclone separator includes a cyclone housing defining an internal chamber. A cyclone is at least partially positioned within the internal chamber and is configured to separate a mixed fluid. The cyclone separator further includes a first outlet connected to the cyclone housing, through which a substantial portion of solids from the mixed fluid may exit. The cyclone separator also includes a second outlet connected to the cyclone housing, through which a substantial portion of fluids from the mixed fluid may exit. Additionally, the cyclone separator includes an adjustable inlet assembly positioned between the cyclone and the well. The adjustable inlet assembly is selectively configurable between at least a first inlet configuration and a second inlet configuration for controlling fluid flow from the well into the cyclone based on one or more flow conditions from the well.

20 Claims, 7 Drawing Sheets

(56) References Cited

U.S. PATENT DOCUMENTS

| | | | | |
|---|---|---|---|---|
| 3,180,360 | A * | 4/1965 | Pavlin | F16K 11/044 137/625.5 |
| 3,288,300 | A | 11/1966 | Bouchillon | |
| 3,456,789 | A | 7/1969 | Phipps | |
| 3,494,474 | A | 2/1970 | Estabrook | |
| 3,724,674 | A | 4/1973 | Loison | |
| 3,988,239 | A | 10/1976 | Malina | |
| 4,067,814 | A | 1/1978 | Surakka et al. | |
| 4,175,036 | A | 11/1979 | Frykhult | |
| 4,317,716 | A | 3/1982 | Liller | |
| 4,369,047 | A | 1/1983 | Arscott et al. | |
| 4,375,939 | A * | 3/1983 | Mount | F04D 29/462 138/45 |
| 4,652,363 | A | 3/1987 | Miller | |
| 7,293,657 | B1 | 11/2007 | Kelton et al. | |
| 12,145,160 | B2 | 11/2024 | Bowley | |
| 2009/0256089 | A1 * | 10/2009 | Colding-Kristensen | F16K 1/36 251/360 |
| 2010/0258512 | A1 | 10/2010 | Larson | |
| 2010/0267540 | A1 | 10/2010 | Babb et al. | |
| 2011/0297605 | A1 | 12/2011 | Ross | |
| 2017/0211481 | A1 * | 7/2017 | Denton | F16K 1/12 |
| 2018/0050945 | A1 | 2/2018 | Mcdonald et al. | |
| 2018/0095011 | A1 | 4/2018 | Lewis-Gray | |
| 2020/0282409 | A1 * | 9/2020 | Bartoli | B04C 3/06 |

* cited by examiner

ADJUSTABLE INLET ASSEMBLY FOR SAND SEPARATOR

CROSS-REFERENCE TO RELATED APPLICATIONS

This application is a continuation of U.S. patent application having a Ser. No. 17/731,385 which was filed on Apr. 28, 2022 which claims priority to U.S. Provisional patent application having Ser. No. 63/181,631, which was filed on Apr. 29, 2021, and which are incorporated herein by reference in their entirety.

BACKGROUND

Hydraulic fracturing is a well-treatment process in which preferential flow paths for hydrocarbons are established in a subterranean rock formation by pumping a fluid at high pressures into a well to initiate fractures in the rock formation. The fluid is predominately water, but may also include solids, such as sand or ceramic proppants, which at least partially fill the fractures and maintain the preferential flow paths.

When oil or other fluids are produced/recovered from the well, it may be desirable to remove sand or other solids from the produced fluid. Typically, a separator system is used, which may include one or more separation devices ("separators"), filters, screens, tanks, etc. The separator system is generally connected to a wellhead via pipes or tubing. The fluid thus flows from well, into the wellhead, and then to the separator system, where the solids are separated out. The solids may be stored in a tank and periodically removed, while the fluids may be further separated (e.g., to separate hydrocarbons from water). Recovered hydrocarbons may be stored or otherwise transported for sale, and recovered water may be stored or otherwise recirculated for use in the well.

The separators may be vortical flow or "cyclonic" separators that provide a vortical flow chamber therein. The particulate-laden fluids recovered from the well are introduced into this vortical flow chamber, generally through a tangential inlet. The vortical flow chamber typically has an opening in the top through which an outlet tube is received that extends into the vortical flow chamber. The lighter fluids exit up through this outlet tube. The separators also have an opening in the bottom, through which the heavier solids are received. The fluids received into the inlet may be at relatively high pressures and speed, and, since they include particulate matter such as sand, may be abrasive to the structure defining the vortical flow chamber and can lead to frequent maintenance requirements for the wellhead systems and relatively short lifecycles for the separators.

During the lifecycle of a well, the fluid flow rate of produced fluids may change. Often, the well begins at relatively low fluid flow rate, which becomes progressively higher over time, although wells having reducing flow rates are also common. In either such well, the changing fluid flow rate may affect the vortical flow in the separator, as either fluid flow rates that are too high or too low can decrease the efficiency of the separator. Differently sized, modular nozzles may be provided to adjust the velocity of the fluid. However, to swap out nozzles of different sizes, the separator generally has to be taken offline, which can interrupt production.

SUMMARY

A cyclone separator for use with a well is disclosed. The cyclone separator includes a cyclone housing defining an internal chamber. A cyclone is at least partially positioned within the internal chamber and is configured to separate a mixed fluid. The cyclone separator further includes a first outlet connected to the cyclone housing, through which a substantial portion of solids from the mixed fluid may exit. The cyclone separator also includes a second outlet connected to the cyclone housing, through which a substantial portion of fluids from the mixed fluid may exit. Additionally, the cyclone separator includes an adjustable inlet assembly positioned between the cyclone and the well. The adjustable inlet assembly is selectively configurable between at least a first inlet configuration and a second inlet configuration for controlling fluid flow from the well into the cyclone based on one or more flow conditions from the well.

A method of using a cyclone separator is disclosed. The method includes positioning an adjustable inlet assembly between the cyclone separator and a well. The method further includes selecting between a first inlet configuration and a second inlet configuration of the adjustable inlet assembly based on one or more flow conditions from the well. The method also includes moving a mixed fluid through the adjustable inlet assembly into the cyclone separator. The method further includes separating a substantial portion of the solids from the mixed fluid in the cyclone separator. Additionally, the method includes adjusting the adjustable inlet assembly between the second inlet configuration and the first inlet configuration based on one or more flow conditions from the well.

A method of using a cyclone separator attached to a well is disclosed. The method includes selecting a nozzle based at least partially on a fluid flow rate of a mixed fluid from the well. The method further includes feeding the mixed fluid through the nozzle into the cyclone separator. The method also includes separating a substantial portion of the solids from the mixed fluid in the cyclone separator. Additionally, the method includes adjusting the nozzle between a first configuration to a second configuration, wherein the first configuration has a first cross-sectional flow path area and the second configuration has a second cross-sectional flow path area different from the first cross-sectional flow path area.

BRIEF DESCRIPTION OF THE DRAWINGS

The present disclosure may best be understood by referring to the following description and the accompanying drawings that are used to illustrate embodiments of the invention. In the drawings.

DETAILED DESCRIPTION

Figure 1:
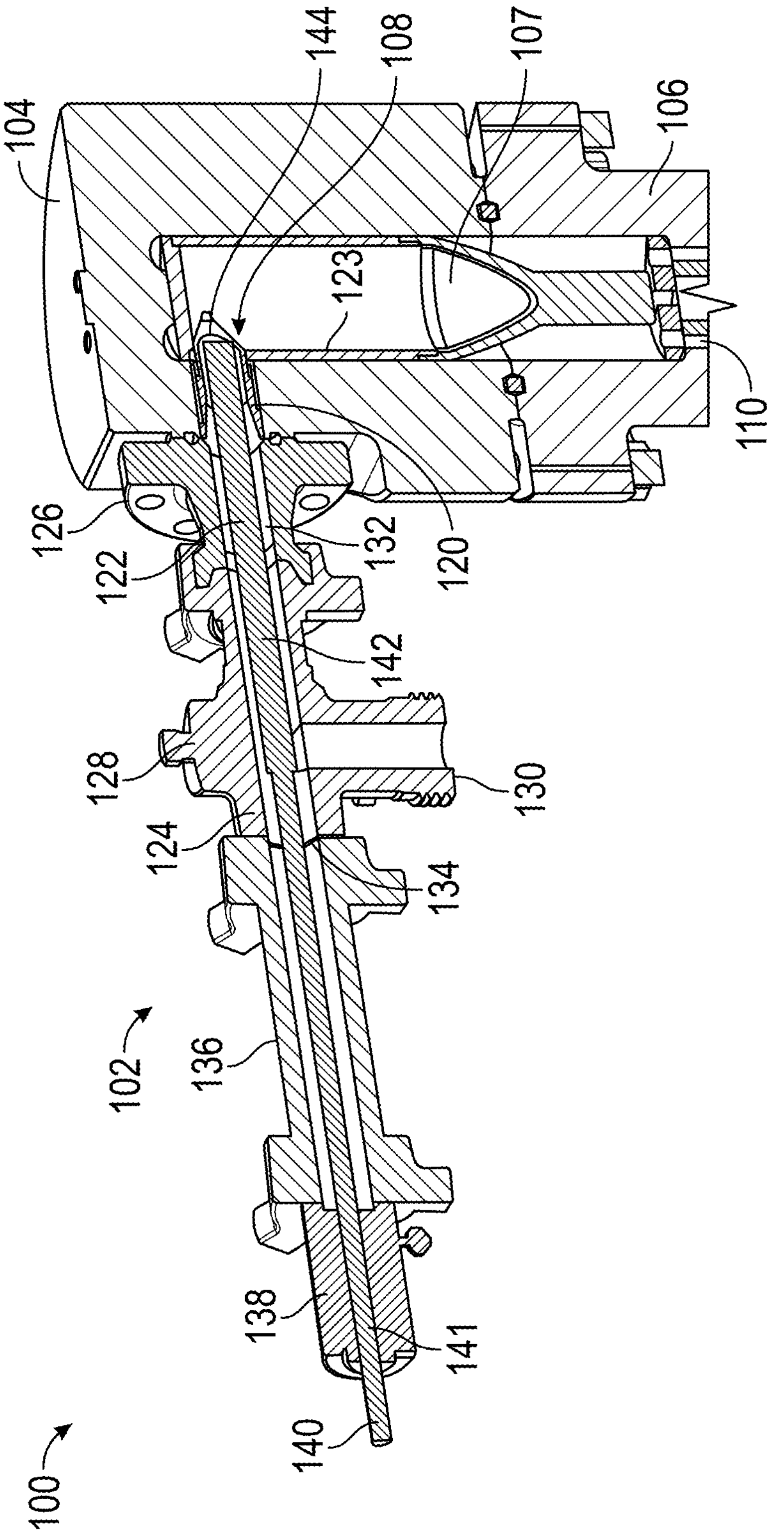
FIG. 1 illustrates a perspective, sectional view of a separator system including an adjustable inlet assembly in a first configuration, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a perspective, sectional view of a separator system 100 including and adjustable inlet assembly 102, according to an embodiment. The separator system 100 may also include a cyclone housing 104 that defines an internal chamber therein, and an accumulator 106 that is connected to and positioned below the cyclone housing 104. A cyclone 107 may be positioned at least partially in the internal chamber of the cyclone housing 104 and, as shown, at least partially in the accumulator 106. Further, the cyclone housing 104 may include an (e.g., tangential) inlet 108, a first outlet 110, and a second outlet, which is not visible in this figure, but may extend upward through the cyclone housing 104. In at least some embodiments, a fluid that carries a relatively high percentage of solids (e.g., sand) may be received into the inlet 108. The cyclone 107 may induce a vortical flow, which may force higher-density materials to flow to the radial outside, and lower-density materials to flow toward the center. The higher density materials (e.g., the sand) may eventually fall downward, through the first outlet 110 and into the accumulator 106, while the lower-density materials (e.g., fluids having a relatively lower percentage of solids) may proceed upward through the cyclone 107 and out the second outlet.

The inlet assembly 102 may be connected to the inlet 108 and may be configured to deliver fluid thereto for separation in the cyclone 107. The inlet assembly 102 may include a nozzle 120 and a movable rod 122. The nozzle 120 may be received into the cyclone housing 104, specifically the inlet 108, and may be profiled so as to follow the shape of a cylindrical/circumferential inner surface 123 of the cyclone housing 104, such that the nozzle 120 does not protrude into the inner chamber of the cyclone housing 104 or otherwise disrupt the vortical flow of fluid induced by the cyclone 107.

The inlet assembly 102 may also include an inlet housing 124 that may be connected to an exterior of the cyclone housing 104. The inlet housing 124 may include a flange 126 that connects directly to the cyclone housing 104, e.g., around the inlet 108, and seals with the cyclone housing 104. The flange 126 may be sized and configured to permit fluid communication therethrough to the inlet 108, while holding the nozzle 120 within the inlet 108. The inlet housing 124 may also include a T-connection 128, which may be coupled to the flange 126. The T-connection 128 may have a first port 130 that is configured to receive the fluid flow therethrough, and may be disposed at a non-zero angle, e.g., a 90 degree angle, to the inlet 108. The T-connection 128 may also have a second port 132 that faces toward, and parallel to, the inlet 108, e.g., at a 90 degree angle to the first port 130. The fluid flow received in the first port 130 may be directed within the T-connection 128 to the second port 132. The T-connection 128 may further have a third port 134 that is also oriented parallel to the inlet 108. The movable rod 122, in the illustrated first position, extends through the second and third ports 132, 134, past the first port 130, and into the nozzle 120.

The inlet housing 124 may also include a cylindrical extension 136, which may be attached to or integral with the T-connection 128. The cylindrical extension 136 may be hollow, and the movable rod 122 may extend therethrough. The cylindrical extension 136 may be sized to permit the movable rod 122 to be moved laterally from within the T-connection 128, without being completely removed from the inlet housing 124, as will be described in greater detail below. A packing seal 138 may be connected to the cylindrical extension 136 (or directly to the T-connection 128, in some embodiments). The packing seal 138 may receive the movable rod 122 therethrough, such that the movable rod 122, in some embodiments, may be partially within the sealed, pressurized inlet housing 124, and partially extending outward therefrom.

The inlet assembly 102 may also include an actuator (not shown) that moves the movable rod 122 relative to the nozzle 120. The actuator may be a threaded connection that engages a proximal end 140 of the movable rod 122 and the inlet housing 124, such that rotating actuator, and potentially the movable rod 122 therewith, advances or retracts the movable rod 122 into/out of the nozzle 120 while the inlet housing 124 remains stationary. The actuator may also be a rack-and-pinion. In such an embodiment, the rack portion of the actuator may be fixed to the proximal end 140 of the movable rod 122 and may be moved through the packing seal 138 by rotating the pinion, or the rack could be entirely external to the packing seal 138. In another embodiment, the actuator may be a hydraulic cylinder that acts on the movable rod 122. In other embodiments, the actuator may be an electrical actuator, such as a solenoid. A variety of other actuators could also be used to impart controlled linear movement of the movable rod 122 relative to the nozzle 120, as will be described in greater detail below.

In an embodiment, the movable rod 122 may include a first section 141 and a second section 142. The first section 141 may have a smaller diameter than the second section 142. The first section 141 may thus fit through the packing seal 138, while the second section 142 may not. Accordingly, at least the second section 142 may remain within the inlet housing 124, while at least a portion of the first section 141 may be configured to extend out from the inlet housing 124. In an embodiment, the first section 141 may extend from the proximal end 140 of the movable rod 122, and the second section 142 may extend to a distal end 144 of the movable rod 122, with the distal end 144 of the movable rod 122 being positionable in the nozzle 120, as shown.

In the illustrated view, as mentioned above, the movable rod 122 is in the first position. In the first position, the movable rod 122 partially obstructs fluid flow between the first port 130 of the T-connection 128 and the inlet 108. In particular, the second section 142 may extend through the second and third ports 132, 134 and the nozzle 120, such that the distal end 144 is even with or at least proximal to the inner surface 123 of the cyclone housing 104. Since the movable rod 122 occupies part of the cross-sectional area of the nozzle 120, the movable rod 122 reduces the flow path area, thereby increasing the fluid flow velocity in the nozzle 120.

Figure 2:
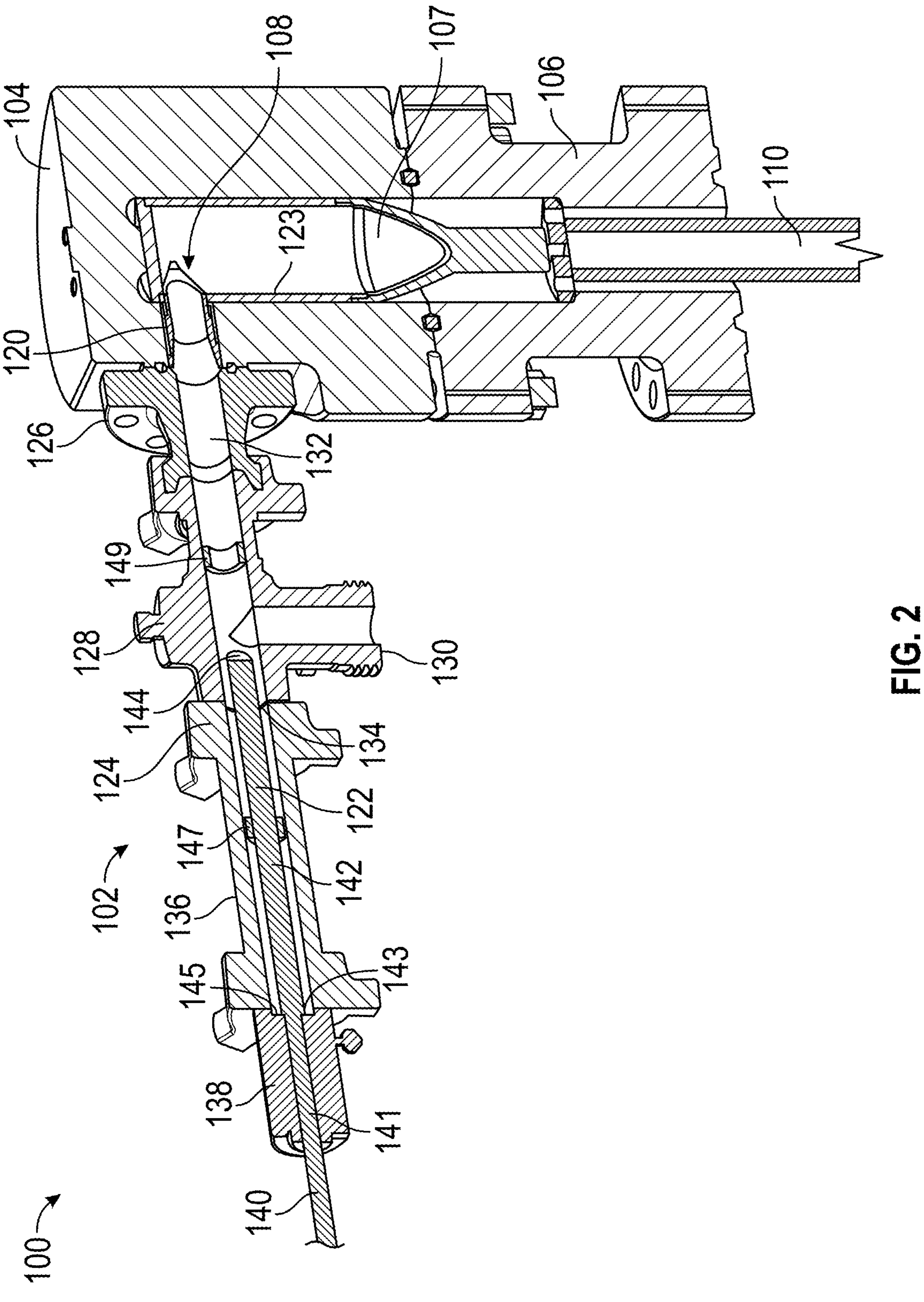
FIG. 2 illustrates a perspective, sectional view of the separator system including the adjustable inlet assembly in a second configuration, according to an embodiment.

FIG. 2 illustrates a perspective, sectional view of the separator system 100 including the adjustable inlet assembly 102, according to an embodiment. In this view, the movable rod 122 has been moved axially away from the nozzle 120 to a second position, where the movable rod 122 is no longer in the nozzle 120. Moreover, the movable rod 122 may be pulled past the first port 130 of the T-connection 128, such that the movable rod 122 does not obstruct fluid flow through the T-connection 128 to the inlet 108. Accordingly, fluid may flow through the entire cross-section of the T-connection 128 between the first port 130 and the second port 132, within the flange 126, and through the nozzle 120.

The movable rod 122 may be moved by the actuator, as mentioned above. The position and angular orientation of the movable rod 122 in the inlet housing 124 may be controlled, such that its distal end 144 does not extend into the cyclone 107, past the inner surface 123. Accordingly, in an embodiment in which the actuator is a threaded connection between the housing 124 and the movable rod 122, an angular position indicator may be provided on the movable rod 122, e.g., a clock mark, that may permit a user to properly align the movable rod 122 within the inlet housing 124.

Figure 3:
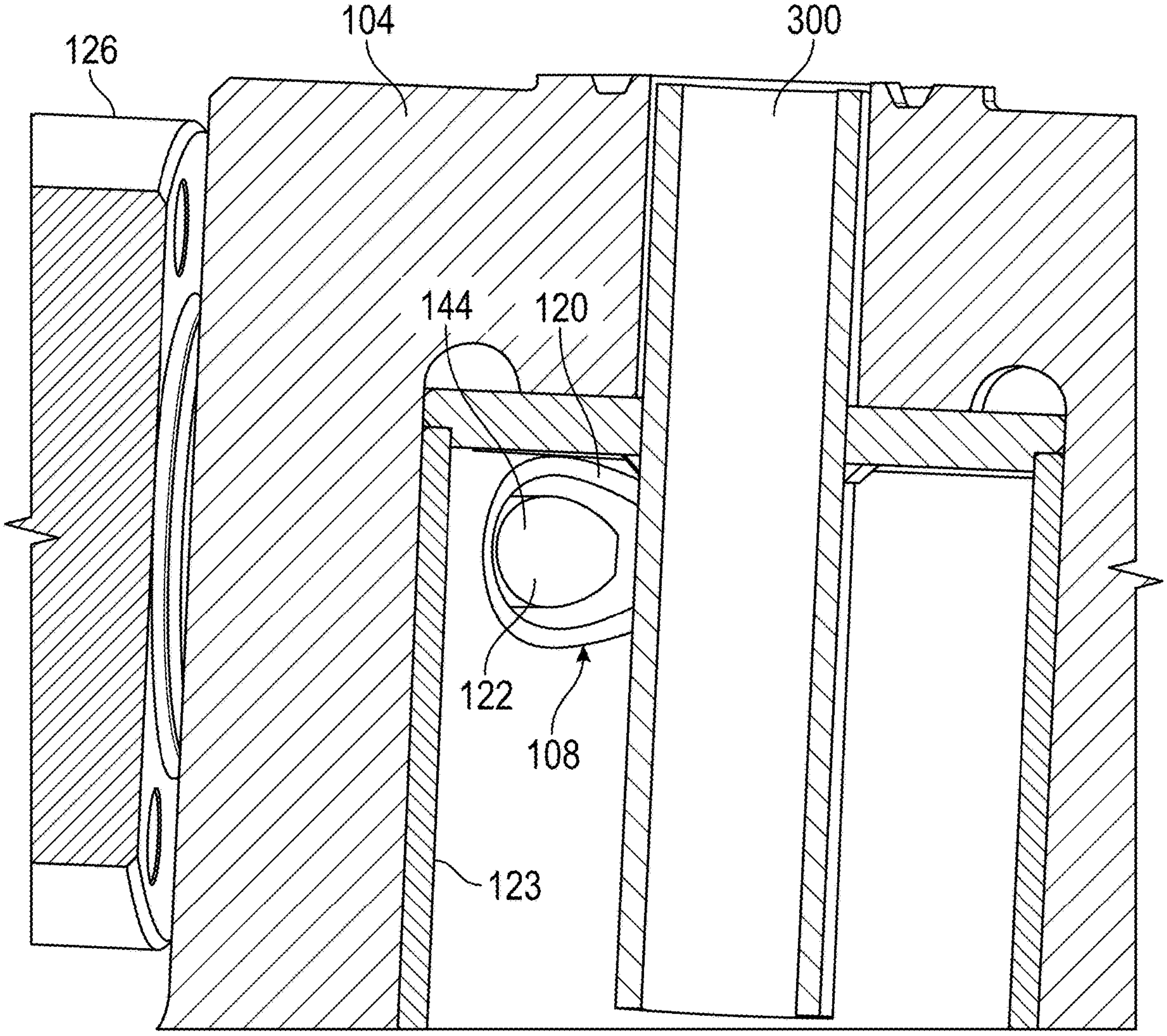
FIG. 3 illustrates a perspective, sectional view of an end of the inlet assembly communicating with an internal chamber of the separator system, according to an embodiment.

FIG. 3 illustrates a sectional view of a portion of the separator system 100, in particular, the cyclone housing 104, from a different angle than the sectional views shown in FIGS. 1 and 2. In this view, the inlet 108 is shown formed in the inner surface 123 of the cyclone housing 104. The second outlet 300 is also shown in this view, through which the separated fluid may proceed out of the cyclone housing 104, after proceeding through the cyclone 107.

The nozzle 120 is positioned in the inlet 108, and is shaped and configured such that its end is flush with the inner surface 123. As such, the nozzle 120 may not interfere with the vortical flow in the cylindrical housing 104. The movable rod 122 is also shown with its distal end 144 positioned in the nozzle 120, e.g., consistent with the first position of the movable rod 122 shown in FIG. 1. Moreover, the distal end 144 may be curved along the same radial dimension as the inner surface 123 and the nozzle 120, such that the distal end 144 may be even with the inner surface 123. In other words, in an embodiment, if the movable rod 122 were to be sized such that it entirely filled the nozzle 120, the movable rod 122 and nozzle 120 would fill the inlet 108 such that the inner surface 123 would be generally continuous. However, the movable rod 122 may not fill the nozzle 120 and may thus permit fluid flow therethrough.

Figure 4:
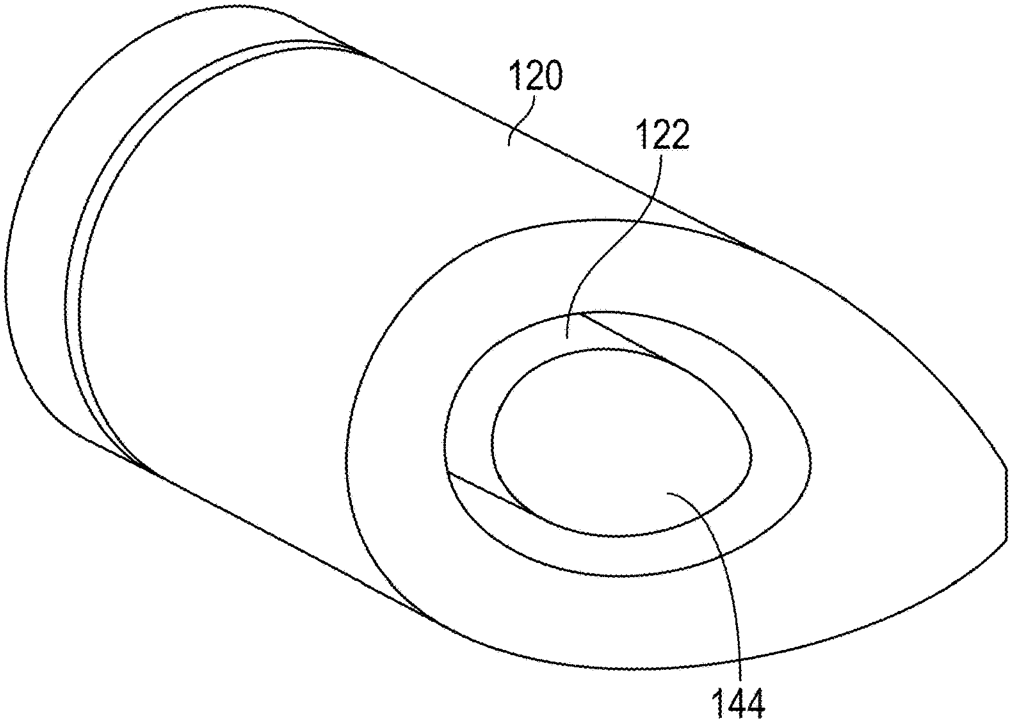
FIG. 4 illustrates a perspective view of a nozzle and an end of an adjustment rod of the inlet assembly, according to an embodiment.
Figure 5:
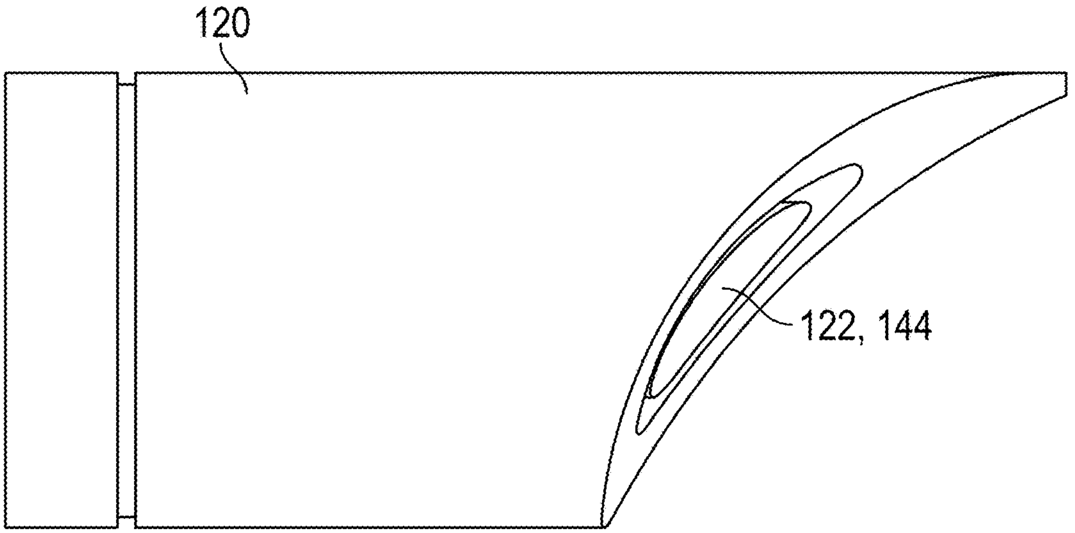
FIG. 5 illustrates a side view of the nozzle and the end of the adjustment rod of the inlet assembly, according to an embodiment.

FIGS. 4 and 5 illustrate two additional views, showing the shape of the nozzle 120 and the distal end 144 of the movable rod 122 therein. As can be seen, when the movable rod 122 is fully received into the nozzle 120, the movable rod 122 does not extend past the nozzle 120, and thus does not extend into the cyclone 107 and disrupt the vortical flow in the cyclone 107.

Figure 6:
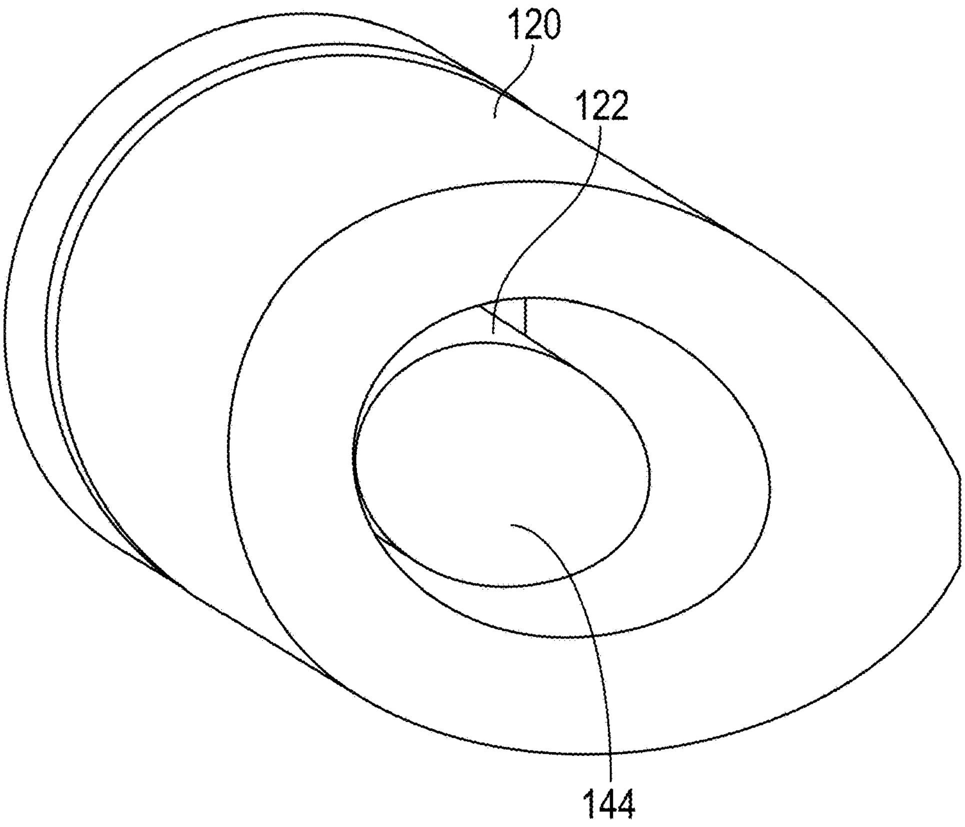
FIG. 6 illustrates a perspective view of the nozzle and the end of the adjustment rod, with the adjustment rod in an eccentric position, according to an embodiment.
Figure 7:
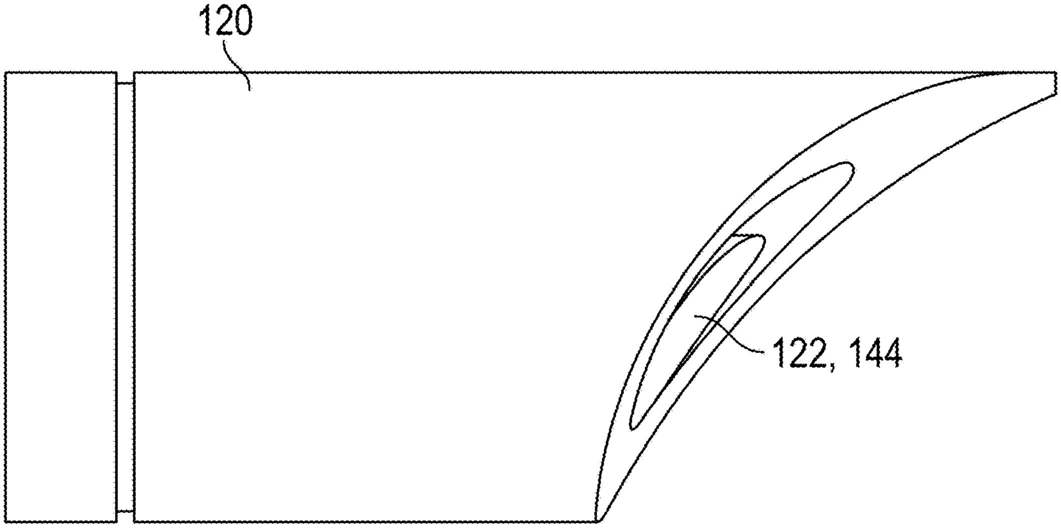
FIG. 7 illustrates a side view of the nozzle and the end of the adjustment rod, with the adjustment rod in the eccentric position, according to an embodiment.

FIGS. 6 and 7 show two more views of the nozzle 120 receiving the distal end 144 of the movable rod 122 therein, according to an embodiment. As shown, the movable rod 122 may not be concentric with the nozzle 120. Rather, as shown, the movable rod 122 may be eccentrically disposed in the nozzle 120 to one side or the other. For example, the movable rod 122 may contact the inside of the nozzle 120, as shown.

Figure 8:
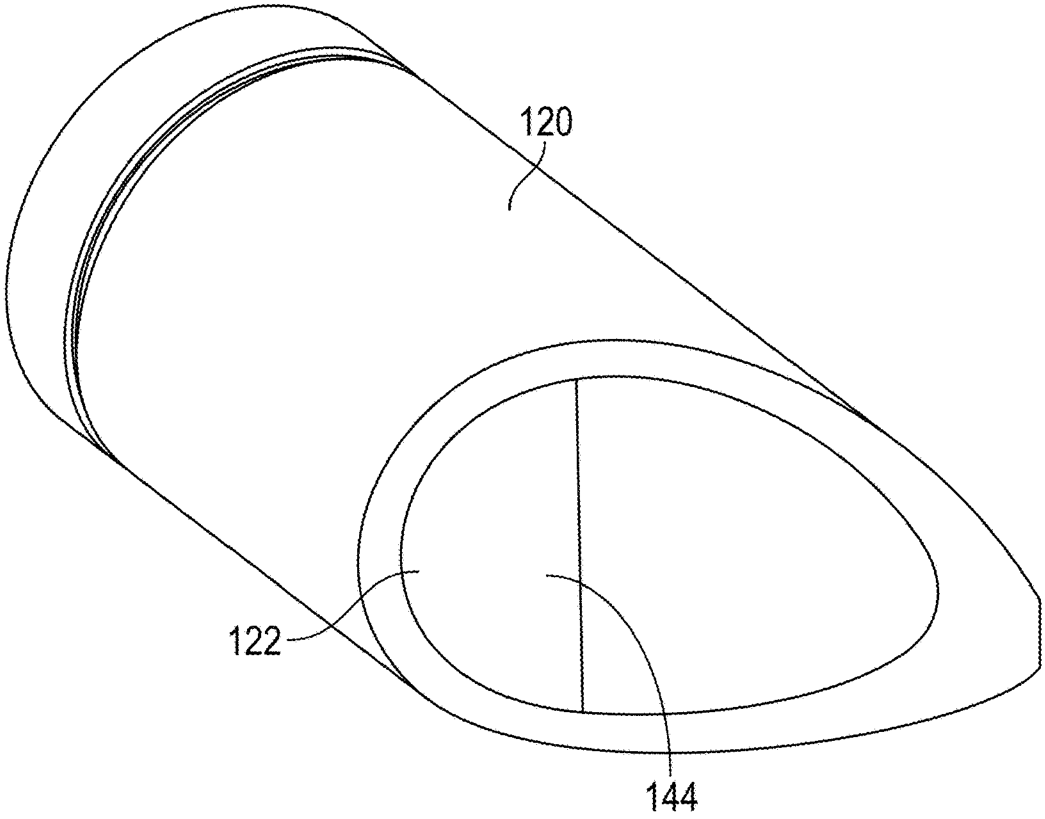
FIG. 8 illustrates a perspective view of the nozzle and an end of another adjustment rod, according to an embodiment.
Figure 9:
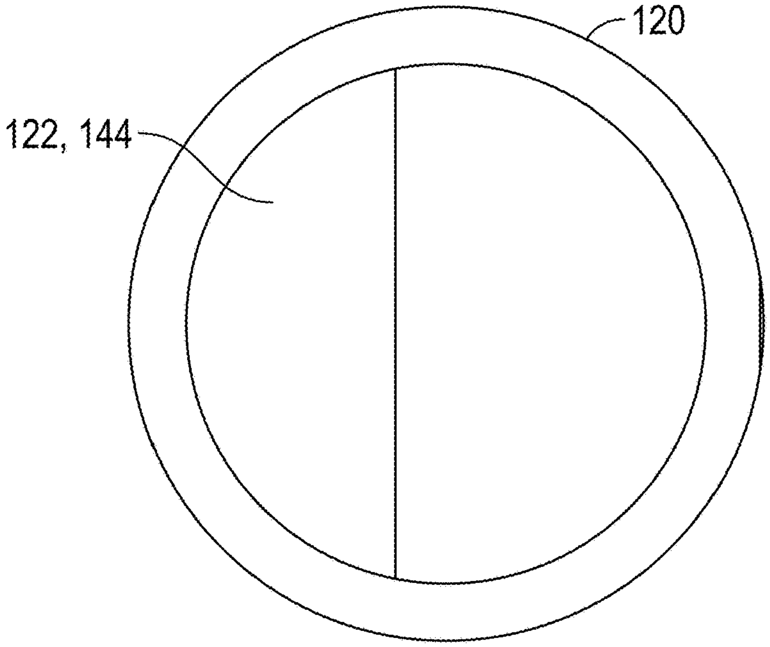
FIG. 9 illustrates an end view of the nozzle and the end of the adjustment rod of FIG. 10, according to an embodiment.
Figure 10:
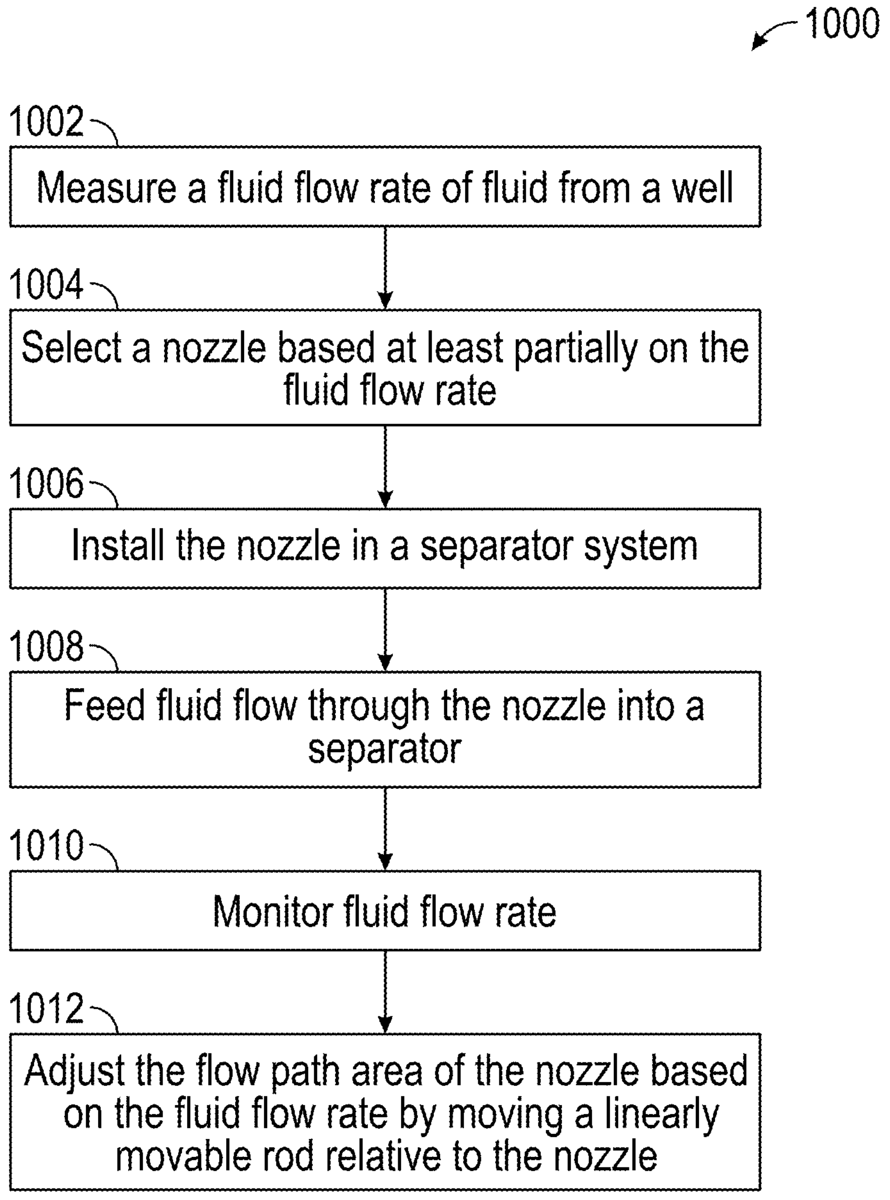

FIGS. 8 and 9 show two views of the nozzle 120 receiving the distal end 144 of another embodiment of the movable rod 122. The movable rod 122 may not be cylindrical, but may be another shape, e.g., semi-cylindrical or "half-moon" shaped. The movable rod 122 may, for example, have a curved surface that defines a radius that substantially matches the radius of the nozzle 120, so as to form a surface area of contact therebetween. The movable rod 122 may also have a flat surface that is spaced apart from the nozzle 120 and thus permits fluid flow past the movable rod 122 and through the nozzle 120.

Moreover, embodiments of the adjustable inlet assembly 102 are contemplated in which two or more movable rods 122 may be movably disposed in the inlet housing 124. In some such embodiments, the multiple rods 122 may be movable independently of one another, such that the flow path area of the nozzle 120 may be modified by sliding one rod 122 into the nozzle 120, then removing the one rod 122 and sliding another (e.g., differently sized) rod 122 into the nozzle 120, and/or by sliding two or more rods 122 (of the same or different sizes) into the nozzle 120 at once. This may permit selection of two or more flow path areas through the nozzle 120. Further, the movable rod 122 may be tapered, stepped, or otherwise profiled such that its orientation and/or relative extension into the nozzle 120 results in different minimum flow path areas through the nozzle 120. As such, the movable rod 122 may be moved across a range of positions to provide a range of flow paths through the nozzle 120.

Further, the nozzle 120 may be selected from several nozzles of varying dimensions. The nozzle 120 may be inserted into and removed from the cyclone housing 104, e.g., to maintain a generally consistent fluid velocity in the cyclone 107 at a variety of different fluid flow (e.g., mass or volumetric flow) rates through the inlet 108. Different rods 122 may be provided for each differently sized nozzle 120, such that each nozzle 120 effectively provides two or more flow path areas, e.g., at least one with the rod 122 positioned therein and one without the rod 122 positioned therein. In other embodiments, a larger nozzle 120 may use the same movable rod 122 as a smaller nozzle 120. In other embodiments, a single movable rod 122 may be used with a smaller nozzle 120 and that movable rod 122 and one or more other rods 122 (of the same or different shape) may be used with the larger nozzle 120. In some embodiments, the nozzle 120 may be shaped or otherwise profiled such that insertion and withdrawal of the movable rod 122 into/out of the nozzle 120 modulates the flow path area through the nozzle 120 across a range of possible areas.

In operation, the inlet assembly 102 may be employed to adjust the cross-sectional flow path area of the inlet 108 to the cyclone housing 104. In some cases, this may be accomplished without interrupting fluid flow to the cyclone housing 104 or the cyclone 107 therein, but may be accomplished while such fluid flow, and separation of sand therefrom, is ongoing. For example, the operation may be implemented as a method, which may include determining flow rate of fluid from a well to which the separator system 100 is, or is to be, connected. A nozzle 120 may be selected based at least partially on this fluid flow rate, e.g., to produce a desired vortical flow velocity in the cyclone 107. The fluid flow may then proceed through the nozzle 120, e.g., while the movable rod 122 is in the second position (FIG. 2), i.e., not obstructing fluid flow through the nozzle 120. In other embodiments, the movable rod 122 may begin in the first position (FIG. 1), such that it partially obstructs fluid flow through the nozzle 120, so as to initiate fluid flow at the desired velocity into the cyclone 107.

At some point, the fluid flow rate from the well may change, for example, diminish, which may lower the vortical velocity of the fluid in the cyclone 107. The velocity may eventually be out of desired range, e.g., potentially impacting the separation efficiency of the separator system 100. Accordingly, the velocity of the fluid in the cyclone 107 may be adjusted by adjusting the flow path area of the nozzle 120. To adjust the flow path area, the movable rod 122 may be moved. For example, to increase the flow path area, the movable rod 122 may be withdrawn from the nozzle 120 to its second position (FIG. 2). To decrease the flow path area, the movable rod 122 may be advanced to its first position (FIG. 1).

The movable rod 122 may be moved automatically, for example, responsive to signals from a controller than is connected to an actuator and/or to sensors that sense velocity, volumetric flow rates, mass flow rates, etc. In other embodiments, the movable rod 122 position may be manipulated manually, e.g., by rotating a threaded connection between the movable rod 122 and the inlet housing 124, energizing a hydraulic, mechanical, or electromechanical actuator, etc.

In some embodiments, more than one movable rod 122 may be provided. Thus, for example, as flow rates continue to change from the well, a second movable rod 122 may be moved, e.g., while the first movable rod 122 remains stationary or is likewise moved, into or out of the nozzle 120. The second movable rod 122 may be adjacent to or positioned around the first movable rod 122. Further, the orientation of the movable rod 122 could be changed and/or the position modulated so as to increase or decrease the minimum flow path area through the nozzle 120.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cyclone separator for use with a well, comprising:

a cyclone housing defining an internal chamber, wherein a cyclone is at least partially positioned within the internal chamber and is configured to separate a mixed fluid;

a first outlet connected to the cyclone housing, through which a substantial portion of solids from the mixed fluid may exit;

a second outlet connected to the cyclone housing, through which a substantial portion of fluids from the mixed fluid may exit; and an adjustable inlet assembly positioned between the cyclone and the well, wherein the adjustable inlet assembly is selectively configurable between at least a first inlet configuration and a second inlet configuration for controlling a fluid velocity of flow proximate to an inner surface of the internal chamber of the cyclone housing based on one or more flow conditions from the well, and wherein changing between the first inlet configuration and the second inlet configuration does not affect the inner surface of the internal chamber of the cyclone housing.

2. The cyclone separator of claim 1, wherein the first inlet configuration has a first cross-sectional flow path area and the second inlet configuration has a second cross-sectional flow path area.

3. The cyclone separator of claim 2, wherein the adjustable inlet assembly comprises a movable member positionable to at least partially obstruct fluid flow in a portion of the inlet assembly to vary a cross-sectional flow path area.

4. The cyclone separator of claim 2, wherein the second cross-sectional flow path area is larger than the first cross-sectional flow path area.

5. The cyclone separator of claim 1, wherein the first inlet configuration has a more restricted flow path area relative to the second inlet configuration, thereby causing an increase in fluid flow velocity of the mixed fluid entering into the cyclone.

6. The cyclone separator of claim 1, wherein the adjustable inlet assembly includes a first port, a second port and a third port, and wherein the mixed fluid enters the first port and exits the second port when the adjustable inlet assembly is in the second inlet configuration.

7. The cyclone separator of claim 1, further comprising an accumulator connected to the first outlet, wherein the accumulator is configured to receive the substantial portion of solids in the mixed fluid.

8. A method of using a cyclone separator, the method comprising:

positioning an adjustable inlet assembly between the cyclone separator and a well, wherein the cyclone separator comprises an internal chamber with an internal surface;

selecting between a first inlet configuration and a second inlet configuration of the adjustable inlet assembly to control a fluid velocity of flow proximate to the inner surface of the internal chamber of the cyclone separator based on one or more flow conditions from the well;

moving a mixed fluid through the adjustable inlet assembly into the cyclone separator;

separating a substantial portion of the solids from the mixed fluid in the cyclone separator; and adjusting the adjustable inlet assembly between the second inlet configuration and the first inlet configuration to control a fluid velocity of flow proximate to the inner surface of the internal chamber of the cyclone separator based on one or more flow conditions from the well, wherein adjusting the adjustable inlet assembly between the second inlet configuration and the first inlet configuration does not affect the profile of the inner surface of the internal chamber of the cyclone separator.

9. The method of claim 8, further comprising sensing one or more flow conditions from the well, and in response to the sensed conditions, causing adjustment of the adjustable inlet assembly between the first inlet configuration and the second inlet configuration.

10. The method of claim 8, wherein the first inlet configuration has a first cross-sectional flow path area and the second inlet configuration has a second cross-sectional flow path area.

11. The method of claim 10, wherein the second cross-sectional flow path area is larger than the first cross-sectional flow path area.

12. The method of claim 8, wherein the adjustable inlet assembly is adjusted when the flow rate of the mixed fluid changes.

13. The method of claim 8, wherein the adjustable inlet assembly is adjusted to change the velocity of the mixed fluid entering into the cyclone separator.

14. A method of using a cyclone separator attached to a well, the method comprising:

selecting a nozzle based at least partially on a fluid flow rate of a mixed fluid from the well;

feeding the mixed fluid through the nozzle into the cyclone separator, wherein the cyclone separator comprises an internal chamber with a circumferential inner surface;

separating a substantial portion of the solids from the mixed fluid in the cyclone separator; and controlling a fluid velocity of flow proximate to the circumferential inner surface of the internal chamber of the cyclone separator by adjusting the nozzle between a first configuration to a second configuration, wherein the first configuration has a first cross-sectional flow path area and the second configuration has a second cross-sectional flow path area different from the first cross-sectional flow path area, and wherein there is no change along the circumferential inner surface of the internal chamber of the cyclone separator when the nozzle is adjusted between the first configuration and the second configuration.

15. The method of claim 14, further comprising increasing the velocity of the mixed fluid entering into the cyclone separator in response to the nozzle being adjusted between the first configuration to the second configuration.

16. The method of claim 14, further comprising decreasing the velocity of the mixed fluid entering into the cyclone separator in response to the nozzle being adjusted between the first configuration to the second configuration.

17. The method of claim 14, further comprising sensing a change in the fluid flow rate, and in response to the sensed change, adjusting the nozzle between the first configuration and the second configuration.

18. The method of claim 14, wherein the nozzle is adjusted to establish a flow velocity of the mixed fluid flow entering the cyclone separator, that is between a maximum velocity threshold and a minimum velocity threshold.

19. The method of claim 14, wherein the nozzle includes a portion that is profiled to follow the circumferential inner surface of the internal chamber.

20. The cyclone separator of claim 1, wherein the adjustable inlet assembly includes a portion that is profiled to follow the shape of the inner surface of the internal chamber.

* * * * *